United States Patent [19]

Bae et al.

[11] Patent Number: 4,983,903
[45] Date of Patent: Jan. 8, 1991

[54] AUTOMATIC BATTERY EXCHANGING SYSTEM FOR AUTOMATIC GUIDED VEHICLES

[75] Inventors: Kisun Bae; Yunghoon Joo, both of Suwon Kyungki, Rep. of Korea

[73] Assignee: Samsung Electronics Co., Ltd., Rep. of Korea

[21] Appl. No.: 379,046

[22] Filed: Jul. 13, 1989

[30] Foreign Application Priority Data

Jul. 13, 1988 [KR] Rep. of Korea .................. 88-8716

[51] Int. Cl.$^5$ .......................... B65G 67/00; H22J 7/00
[52] U.S. Cl. .......................................... 320/2; 104/34
[58] Field of Search ...................... 320/2, 15; 104/34

[56] References Cited

U.S. PATENT DOCUMENTS

| | | | |
|---|---|---|---|
| 4,227,463 | 10/1980 | Pfleger | 104/34 |
| 4,334,819 | 6/1982 | Hammerslag | 104/34 X |
| 4,342,533 | 8/1982 | Hane | 104/34 X |
| 4,413,219 | 11/1983 | Ducharme et al. | 320/2 X |
| 4,450,400 | 5/1984 | Gwyn | 320/2 |
| 4,496,274 | 1/1985 | Pipes | 104/34 X |

Primary Examiner—R. J. Hickey
Attorney, Agent, or Firm—Saidman, Sterne, Kessler & Goldstein

[57] ABSTRACT

An automatic battery exhanging system for use with automatic guided vehicles which is capable of taking out the battery which is discharged below a threshold voltage of usefulness, mounting the battery to a recharging station, and after charging it, taking it back to the automatic guided vehicle so that the automatic guided vehicle may return to normal operation. This is completed under the control of a control unit. The invention comprises a battery mounting and dismounting means, a lifting means, a horizontal conveying means, a charging means, a dropping means, and control unit which automatically executes all of these operations.

4 Claims, 8 Drawing Sheets

AUTOMATIC BATTERY EXCHANGING SYSTEM FOR AUTOMATIC GUIDED VEHICLES

BACKGROUND OF THE INVENTION

The present invention relates to an automatic battery exchanging system, and particularly to an automatic battery exchanging system for use with an automatic guided vehicle (hereinafter AGV) system.

Usually, conveyance and carrying are automatically carried out by AGV's in an automated factory. These AGV's utilize batteries as a power source for their drive systems and all operations are carried out by instructions from a host computer.

A problem with the AGV systems in automated factories is that when the battery is excessively discharged, i.e., to under a final discharge voltage, the AGV will come to a stop and the automatic operation is interrupted.

In order to solve this problem caused by an excessively discharged battery, recharging devices have been developed. A satisfactory effect, however, cannot be expected for an automated factory because the exchange is not automatically carried out.

Recently, in order to solve this problem, a device has been developed which checks the discharge state of the battery being discharged and which is capable of automatically exchanging the battery. Additionally, automatic battery exchanging systems using a robot and a turning rack are known.

These systems are still in the development stages and have many problems. In addition, the structure of these systems is complicated because they use a robot and turning rack. As a result, they have no likely economic advantage because of their complexity and high installation costs.

OBJECT AND SUMMARY OF THE INVENTION

The present invention solves the various problems mentioned above. It is an object of the present invention to provide an automatic battery exchanging system, for use in an AGV system, capable of automatically exchanging the battery while maintaining a simple structure.

In order to accomplish this object, the present invention comprises: a battery mounting and dismounting means for mounting and dismounting the battery to and from an AGV, a battery charging means, a horizontal conveyor means, and a raising and lowering conveyor means for conveying the battery to and from the battery charger means.

BRIEF DESCRIPTION OF THE DRAWINGS

Throughout the drawings, like reference numerals and symbols are used for designating like or equivalent parts or portions for simplicity of illustration and explanation.

DETAILED DESCRIPTION OF THE PREFERRED EMBODIMENT

Hereinafter, a preferred embodiment of the present invention will be described in detail with reference to the accompanying drawings.

Figure 1:
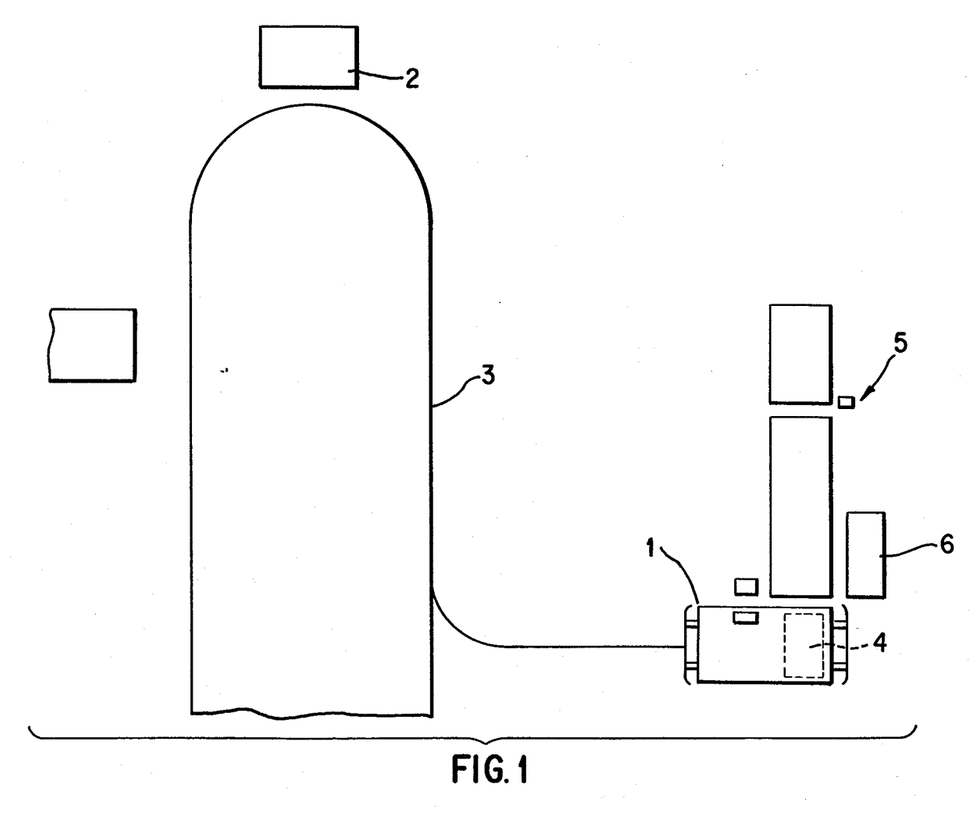
FIG. 1 is a diagram of a sample AGV system utilizing the present invention.

FIG. 1 is a schematic diagram for illustrating an exemplary application of a preferred embodiment of the present invention in which an AGV 1 travels along a predetermined route 3 according to the instruction of host computer 2. The AGV 1 is usually equipped with a battery discharge state detecting circuit (not shown). During its travel along the route 3, and when the battery 4 of the AGV is discharged beyond a threshold point, its state is detected by the battery discharge state detecting circuit, and a signal is sent to host computer 2. When the signal representing the state of battery discharge is received by the host computer 2, the host computer 2 instructs the AGV 1 to leave its route 3, and proceed to a battery recharging station 5. When the AGV 1 reaches the battery recharging station 5, a signal is transmitted to a control unit 6 which causes the battery recharging station 5 to be placed into operation.

Figure 2:
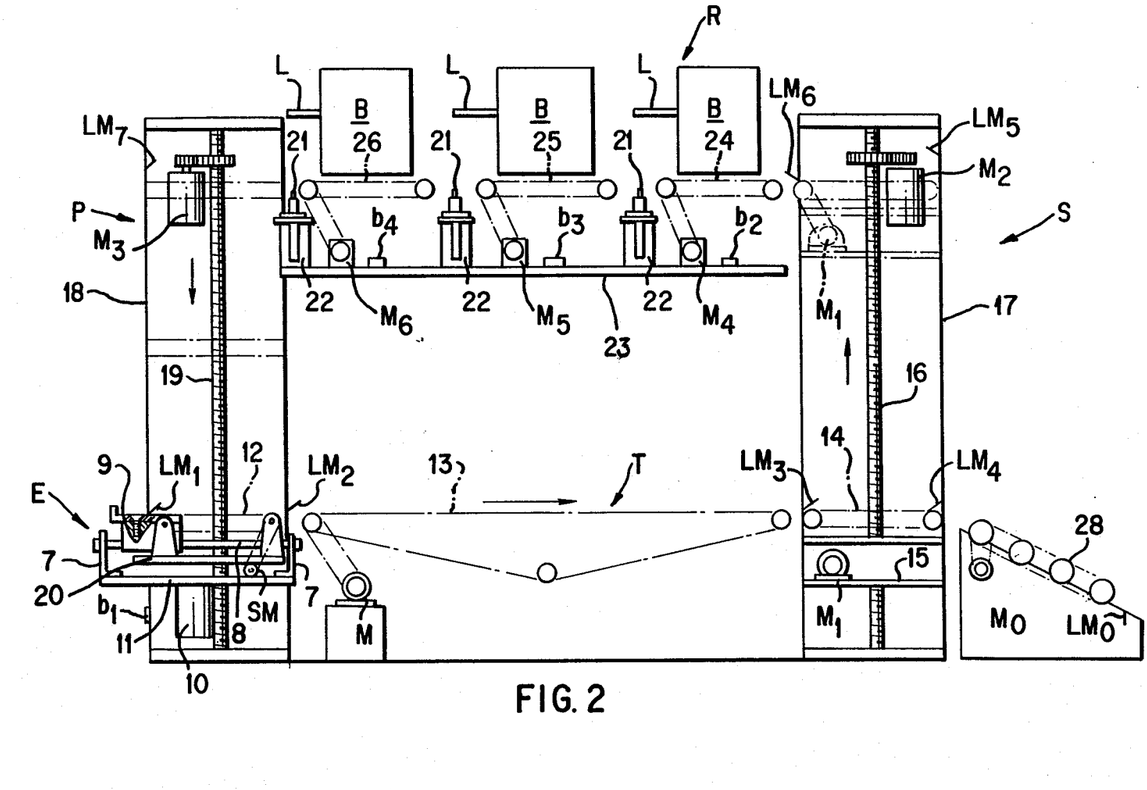
FIG. 2 is a structural diagram showing the entirety of a preferred embodiment of the automatic battery exchanging system of the present invention.
Figure 3:
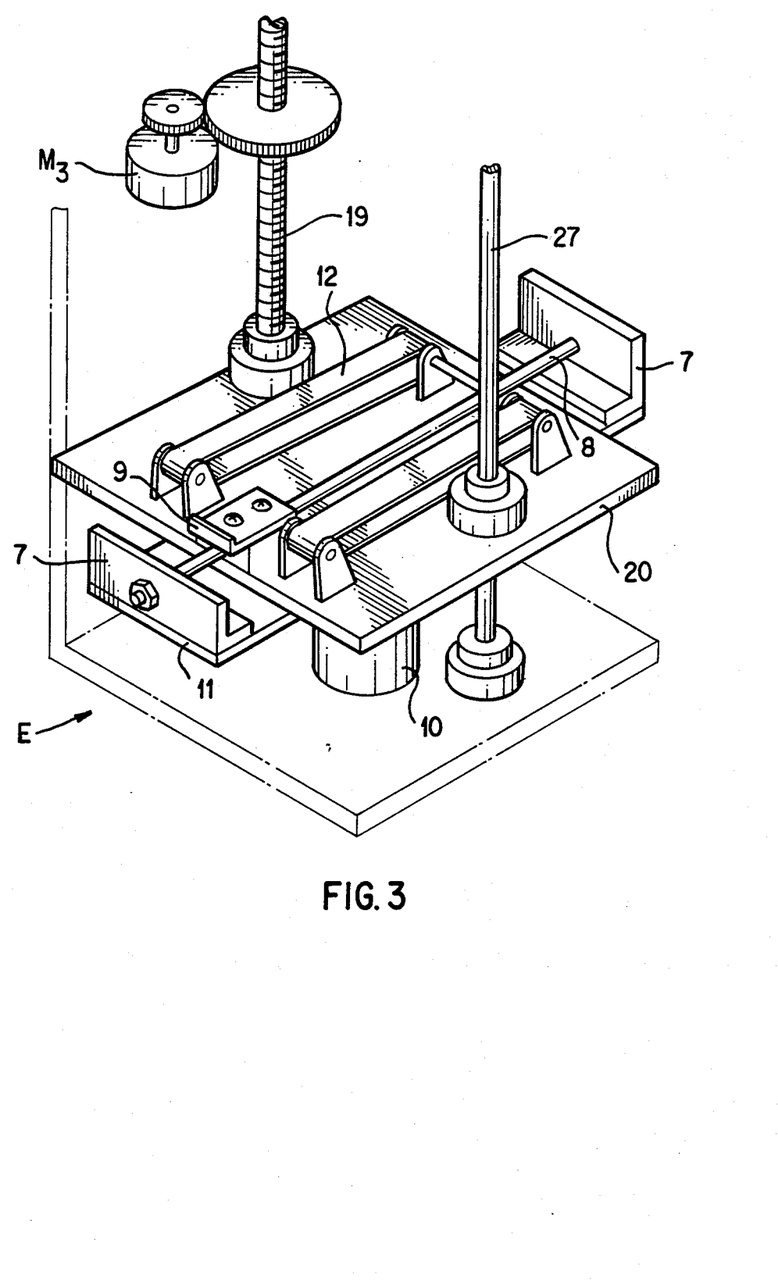
FIG. 3 is a fragmentary perspective view showing the battery exchanging portion of the system.

The battery recharging station 5 is shown in FIG. 2. An expanded view of the battery exchanging portion is shown in FIG. 3. The exchanging portion is provided with a rodless cylinder 8 at a bracket 7. The rodless cylinder 8 is formed with a hook 9. This hook 9 moves front to back by the operation of the rodless cylinder 8. The bracket 7 provided with the rodless cylinder 8 is fixed to a lifting and dropping plate 11 which may be raised and lowered by an air pressure cylinder 10 to form a battery mounting and dismounting means E.

Conveyors 12, having a driving means or motor SM as a driving power source, are mounted on a lifting and dropping plate 20 on either side of the rodless cylinder 8. Another conveyor 13 is driven by a driving means or motor M and is aligned in a longitudinal direction with the conveyors 12. Yet another conveyor 14 is longitudinally aligned and extends therefrom. Both conveyors 13 and 14 keep the same level horizontally with the conveyor 12; together they form a horizontal battery conveyance means T. Conveyor 14 of the horizontal battery conveyance means T is driven by a driving means M1, and this driving means M1 is fixedly mounted to a lifting and dropping plate 15. The plate 15 is coupled to a threaded rod or ball screw 16 which is driven by a driving means or motor M2, to define a raising and lowering means S.

The threaded rod 16 is mounted vertically to a supporting frame 17. When the threaded rod 16 is turned by driving means M2, the plate 15 is raised or lowered. Accordingly, the conveyor 14 is also raised or lowered together therewith.

Battery mounting and releasing means E, located on the end of the battery recharging station 5 opposite of the raising and lowering means S, is provided with a supporting frame 18, and a threaded rod 19 which is turned by a driving means M3. This threaded rod 19 is provided with a lifting and dropping plate 20 for moving stably up and downward upon a supporting bar 27 (shown in FIG. 3, but removed from FIG. 2 for simplification of that drawing), thereby defining a lowering means P.

Referring still to FIG. 2, a battery charging means R is provided at the upper portion between the supporting frames 17 and 18. The battery charging means R is provided with a number of air pressure cylinders 22 mounted to a fixed plate 23. Each air pressure cylinder 22 has a charging socket 21 disposed at its moveable upper end. The battery charging means R further comprises conveyors 24, 25 and 26, each driven respectively by driving means or motors M4, M5 and M6.

Although three charging stations are disclosed in this embodiment of the invention, it should be understood that this number was chosen only as one embodiment useful for teaching the invention and that the invention is not restricted to this number. As a matter of course, it is possible to increase or decrease this number according to the requirements of the overall AGV system.

Figure 4:
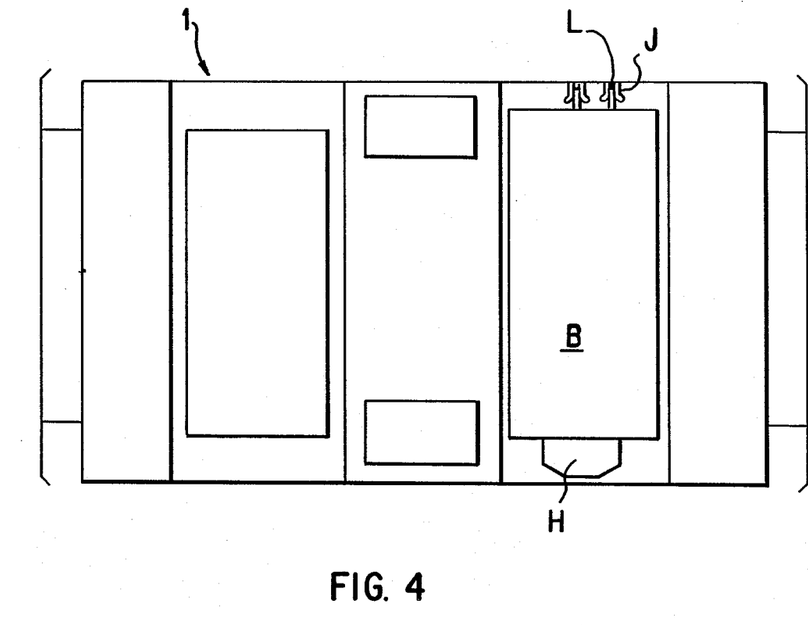
FIG. 4 is a plane view of an AGV containing a battery capable of utilizing the present invention.

FIG. 4 shows a battery appropriate for realizing the present invention. As shown in FIG. 4, a coupling means H to be coupled with hook 9 of said rodless cylinder 8 is fixedly mounted at one side of the battery B, and contact terminals L project from the opposite side. An AGV 1 is provided with jacks J for making connection with these terminals L. Usually, banana jacks will be used for jacks J.

Figure 5:
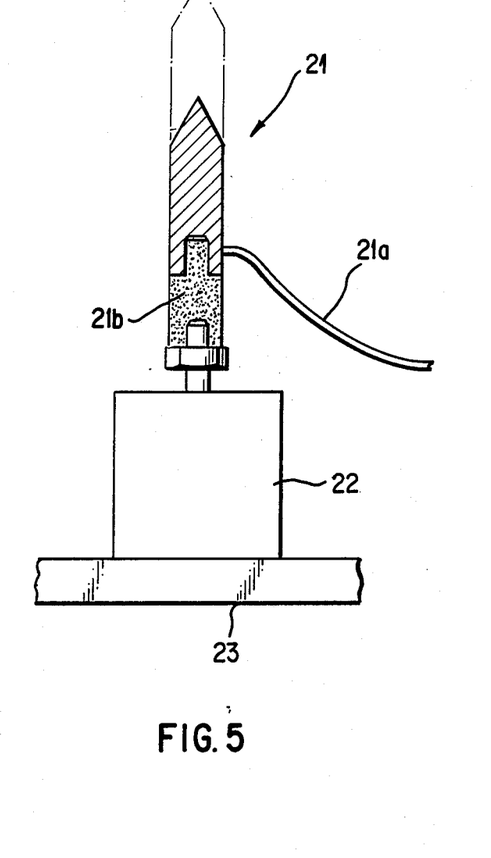
FIG. 5 is a schematic diagram of the charging bar of this invention.

In FIG. 5, a charging current is provided to the battery via the charging socket 21 through a wire 21a connected to a source of charging current. Non-conductive material 21b insulates the electrically active charging socket 21 from the fixed plate 23. The charging current is supplied by a known battery charging means.

According to the present invention having such construction, as aforementioned, when the AGV 1 reaches the battery mounting and releasing means E of the battery recharging station 5, a signal is transmitted to the control unit 6 to cause the battery recharging station 5 to operate. A detailed description of this operation will be explained with reference to FIGS. 2 and 6.

Figure 6:
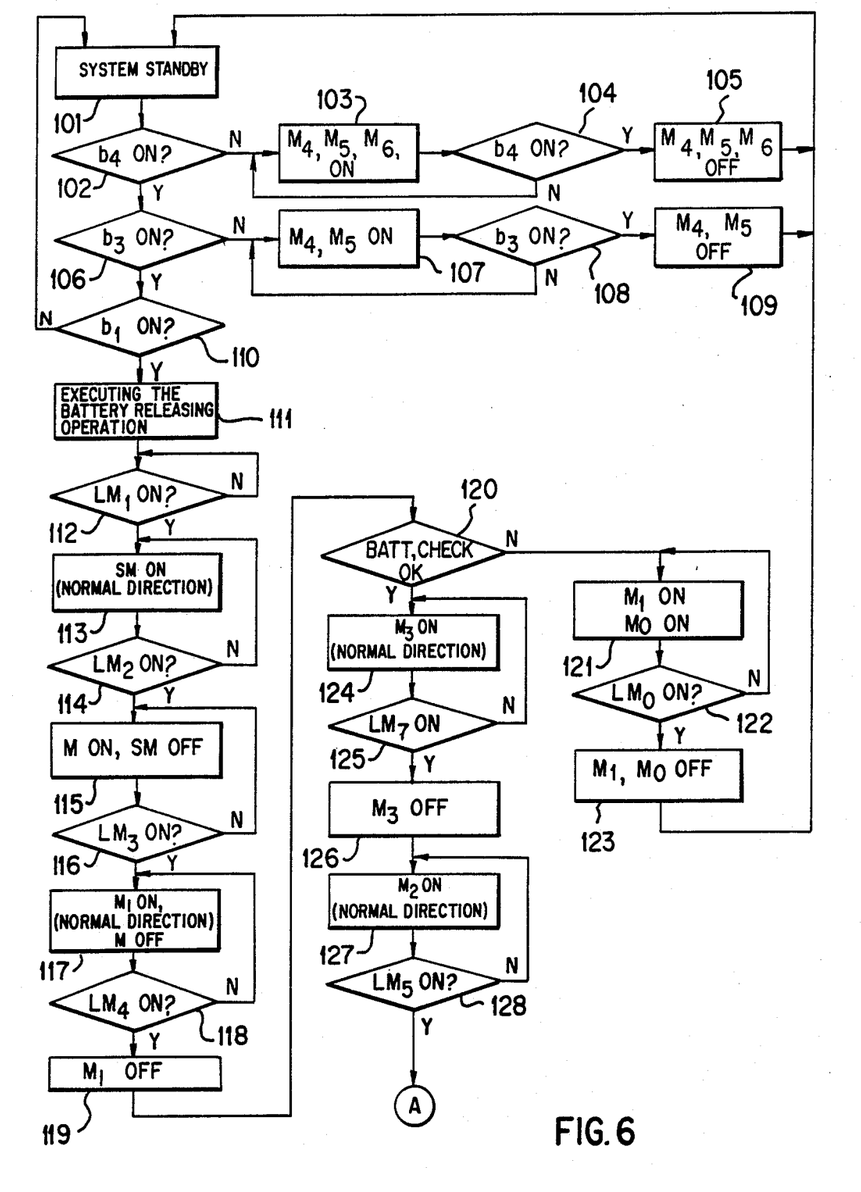
FIG. 6 and 6A show a flow chart of an operational sequence of the present invention.
Figure 6A:
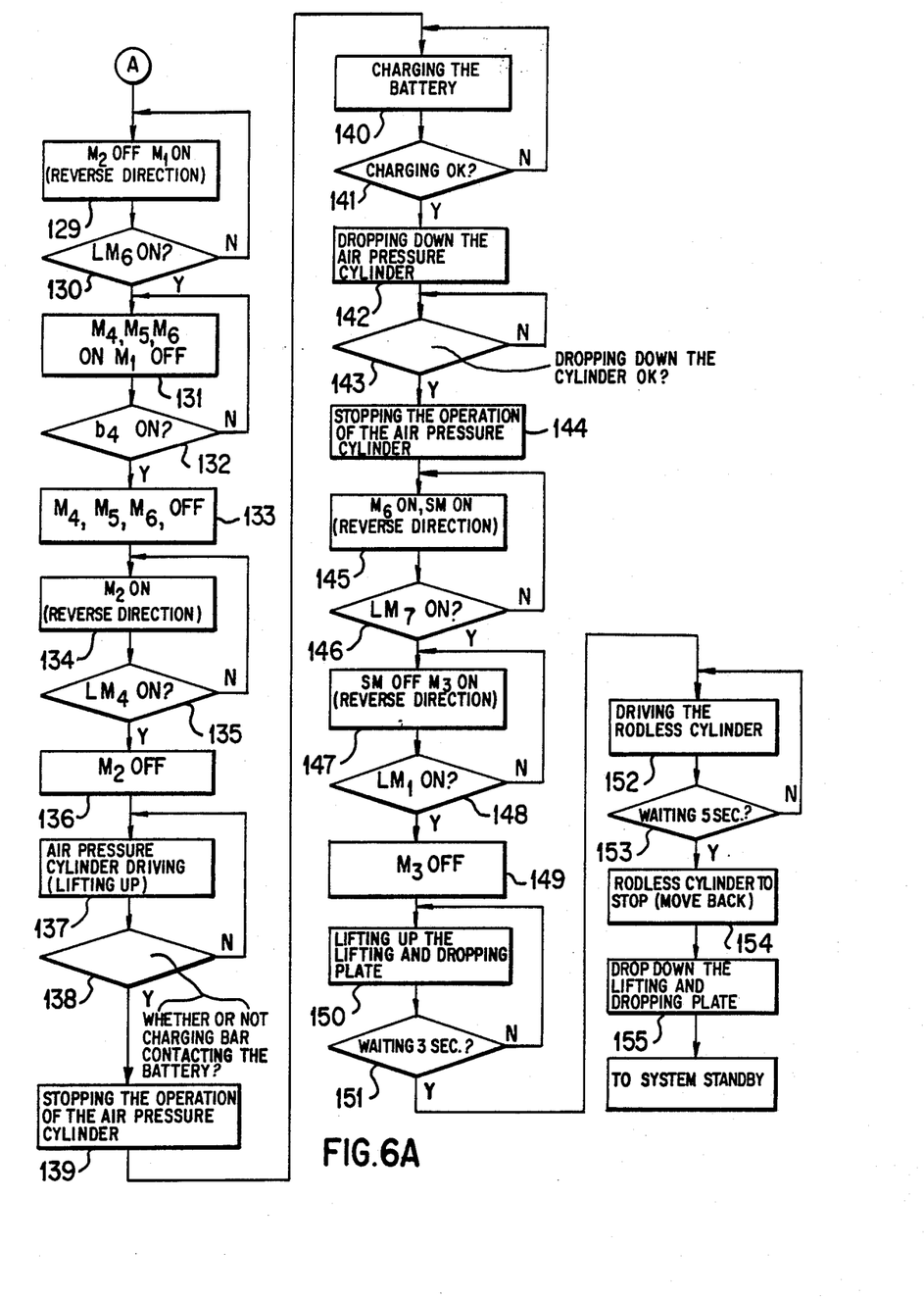

In standby or initial state (step 101), the control unit 6 has a sensor b4 to detect whether or not a battery B is loaded on the conveyor 26 (step 102). If it is not, then the control unit 6 will engage the driving means M4, M5 and M6 (step 103). If sensor b4 then detects a battery B on the conveyor 26 (step 104), the control unit 6 will disengage driving means M4, M5 and M6 (step 105) and return to the system standby state.

After a battery B is detected on the conveyor 26 at step 102, a sensor b3 detects whether a battery B is on the conveyor 25 (step 106). If a battery is not detected, then the control unit 6 will engage driving means M4 and M5 (step 107). Then, when sensor b3 detects a battery B on the conveyor 25 (step 108), the control unit 6 will stop driving means M4 and M5 (step 109) and return to the system standby state.

When a battery B is loaded on the conveyor 25 and a sensor b1 detects that an AGV 1 is present at the battery mounting and dismounting means E (step 110), the battery dismounting operation is executed (step 111). Hook 9 is moved forward by operation of rodless cylinder 8. Thereby, the hook 9 is aligned with the coupling means H of the battery B on the AGV 1 such that when the air pressure cylinder 10 is driven and the plate 11 is raised, the hook 9 is hooked to the coupling means H.

Figure 7:
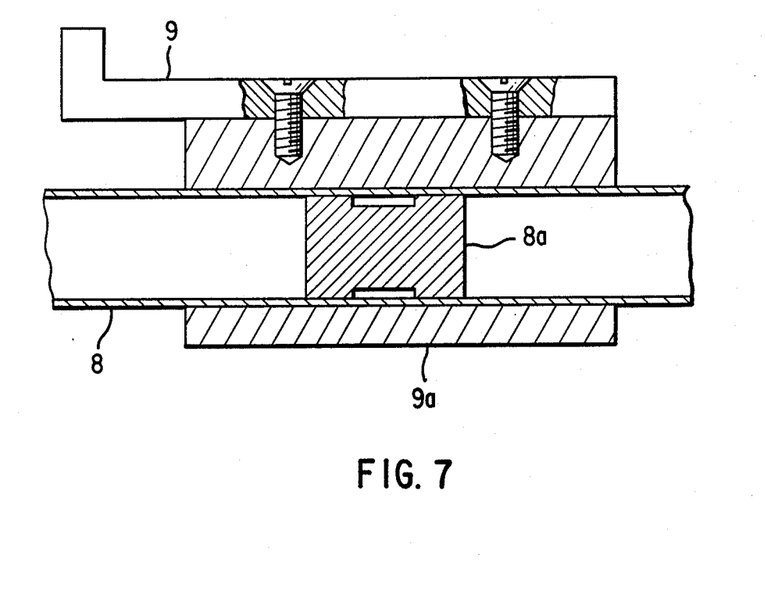
FIG. 7 is a cross-sectional view of the rodless cylinder and hook assembly.

The rodless cylinder 8 is detailed in FIG. 7. A magnet piston 8a is disposed within rodless cylinder 8. Magnetic piston 8a may then by caused to move along the length of rodless cylinder 8 by operation of known hydraulic or pneumatic means connected to rodless cylinder 8.

Carriage 9a comprises a magnetic material and is fixedly attached to hook 9. This magnetic material of carriage 9a is magnetically coupled to magnetic piston 8a through the wall of rodless cylinder 8. When magnetic piston 8a is caused to move along the length of rodless cylinder 8 by operation of a hydraulic or pneumatic means, carriage 9a and attached hook 9 will move correspondingly.

When the hook 9 is moved backward by operating the rodless cylinder 8, the battery B is dismounted or drawn out from the AGV 1. When a ball caster or the like is provided at the bottom of the case containing the battery B, a smooth extraction will be carried out. The battery B is drawn by the hook 9 onto the conveyors 12 which are mounted on both sides of the rodless cylinder 8.

When this state is detected by a limit switch LM1 at step 112, the plate 11 is lowered by operating and then stopping the air pressure cylinder 10 and then instructing driving means SM to operate (step 113).

The operation of driving means SM drives conveyors 12 and thereby the battery B is transported along the conveyors 12. When the battery B is detected by a limit switch LM2 (step 114), the driving means M is engaged and then the driving means SM is stopped. Thereby, the conveyor 13 is made to operate (step 115).

When the battery B moving along the conveyor 13 trips a limit switch LM3 to the ON position (step 116), driving means Ml is turned ON in the normal direction, driving means M is stopped and the battery B is made to move through the conveyor 14 (step 117).

When the movement of the battery B is confirmed by a limit switch lM4 (step 118), the operation of the driving means Ml is stopped (step 119). The battery B is then checked (step 120) to determine whether to do a recharge of the battery B on the conveyor 14.

The battery B is checked by a known checking means. If it is determined that a recharge is not possible, then the driving means M1 and M0 are both engaged (step 121), thereby removing the battery B from service by the conveyor 14 and the withdrawal conveyor 28. Detection of a battery B by a limit switch LM0 (step 122) will stop the operation of the driving means Ml and M0 and return the system to the system standby state (step 123).

On the other hand, when it is confirmed that recharging is possible, a driving means M3 is caused to operate in the normal direction so that the lifting and dropping plate 20 is moved upward by the threaded rod 19 at step 124. When the limit switch LM7 detects that the plate 20 is completely moved to its upward position (step 125), the operation of the driving means M3 is stopped (step 126) so as to make preparation to receive a completely charged battery B from conveyor 26.

The driving means M2 is driven in the normal direction (step 127), thereby lifting the plate 15 so that the battery B is raised. The conveyor 14 is lifted up until it becomes level with conveyor 24. A limit switch LM5 detects the matching of conveyors 14 and 24 (step 128) and disengages driving means M2. Subsequently, driving means Ml is caused to rotate in a reverse direction, so that the conveyor 14 is moved reversely (step 129).

Battery B is moved backward by the reverse movement of the conveyor 14 onto conveyor 24. A limit switch LM6 is tripped (step 130) which makes the driving means M4, M5 and M6 engage to operate the conveyors 24, 25 and 26 to pass battery B off of conveyor 14, and disengages driving means M1 to stop the reverse rotation of conveyor 14 (step 131).

Conveyors 24, 25 and 26 will move the battery B along until a battery is detected by the sensor b4 (step 132). Thereupon, the driving means M4, M5 and M6 which are moving the conveyors 24, 25 and 26 are stopped (step 133).

After the operation of the driving means M1 is terminated, conveyor 14 is caused to move downward by driving the driving means M2 with reverse rotation (step 134). Conveyor 14 is moved downward until it is on the same horizontal level with the conveyor 13; this position is detected by the limit switch LM4 (step 135) and causes the driving means M2 to stop (step 136).

The battery B, which is now located on one of the conveyors 24–26, is charged by lifting up a charging bar 21 by driving the air pressure cylinder 22 (step 137). Engagement of the charging bar 21 with the contacting terminal L of the battery B is checked (step 138) by monitoring the flow of current within the battery charger circuit (not shown). In addition to confirming contact of the terminal L of the battery B and the charging bar 21, the current sensing circuit will monitor charging conditions and can detect when charging is completed or if any abnormal charging conditions occur, and may terminate the charging operation.

If contact of terminal L of the battery and the charging bar 21 is confirmed, then the operation of the air pressure cylinder 22 is stopped (step 139). The battery B is now in the charging state (step 140).

When the charging of the battery B is completed (step 141), the charging bar 21 is dropped down by driving the air pressure cylinder 22 (step 142). When cylinder 22 is in its fully retracted position, operation of the air pressure cylinder 22 is stopped (step 144). In the case of other batteries B being charged on conveyors 24 and 25, the same charging method is carried out at each station.

When the charging is completed on the conveyor 26 (or on all conveyors on which a battery is located) and each air pressure cylinder 22 is retracted, driving means M6 is caused to operate with normal rotation and driving means SM is caused to operate with reverse rotation so that the battery B on the conveyor 26 is transferred to the conveyor 12 (step 145). Upon complete transfer of the battery B to the conveyor 12 and when the limit switch LM7 is tripped ON (step 146), the operation of the driving means SM is stopped. Driving means M3 is then caused to rotate with reverse rotation (step 147). This causes the plate 20 to move downward as the threaded rod 19 is reversely rotated by the driving means M3.

When the plate 20 reaches its downward most point and causes the limit switch LM1 to be turned ON (step 148), the operation of the driving means M3 is stopped (step 149).

After lowering the battery B, the air pressure cylinder 10 is driven to raise plate 11 (step 150). A three second duration wait is then executed (step 151) to assure that the plate 11 is completely raised.

When the plate 11 is completely raised and the hook 9 becomes hooked to the coupling means H of the battery B, rodless cylinder 8 is driven so that the hook 9 is caused to push the battery B (step 152). A five second duration wait is then executed (step 153) during the mounting of the battery B to the AGV 1. This is where the connecting terminals L of the battery B are pushed into the jacks J of the AGV 1 so that the battery exchange is achieved.

Once the battery B is mounted to the AGV 1, the rodless cylinder 8 is caused to stop and to move back (step 154). The air pressure cylinder 10 is now driven so as to drop down the lifting and dropping plate 11 (step 155).

Thus, an automatic battery exchanging system according to the present invention automatically detects the discharged condition of the battery, charges it and exchanges it so that conventional problems are solved. This invention has advantages over the known systems in that the structure is simplified, and accordingly the manufacturing costs are decreased.

It will be appreciated that the present invention is not restricted to the particular embodiment that has been described hereinbefore, and that variations and modifications may be made therein without departing from the spirit and scope of the invention as defined in the appended claims and equivalents thereof.

What is claimed is:

1. A computer-controlled automatic battery exchanging system for exchanging a discharged battery of an automatic guided vehicle with a charged battery, which automatic battery charging system comprises;
    first means for dismounting the discharged battery from the automated guided vehicle and mounting the charged battery in the automated guided vehicle, said first means comprising a hook and a rodless cylinder, said hook being mounted to and movable with said rodless cylinder, and means for raising and lowering said rodless cylinder;
    second means, associated with said first means, for charging the discharged battery;
    third means for transferring the charged battery to said first means for mounting in the automated guided vehicle; and
    a control unit for controlling the execution of said first means, said second means, and said third means.

2. The computer-controlled automatic battery exchanging system of claim 1, further comprising fourth means for determining whether the discharged battery can be recharged.

3. The computer-controlled automatic battery exchanging system of claim 2, wherein said raising and lowering means comprises a threaded rod turned by the rotation of a driving means and a plate coupled to said raising and lowering means.

4. A method for controlling an automatic battery exchanging system comprising the steps of:
    detecting the presence or absence of a battery at the inlet of a recharging station;
    dismounting the battery from an automatic guided vehicle;
    conveying the battery to the lower position of a lifting means;
    raising a lifting plate with the battery thereon to a raised position to align the battery with raised charging station conveyors;
    driving the charging station conveyors to move horizontally, and checking for the presence or absence of the battery on the charging station conveyors;
    lifting a charging socket into contact with a jack of the battery and charging the battery;
    lowering a further plate with the battery to the lower position of the charging station; and
    removing the battery from the further plate and remounting the charged battery to the automatic guided vehicle.

* * * * *

UNITED STATES PATENT AND TRADEMARK OFFICE
CERTIFICATE OF CORRECTION

PATENT NO. : 4,983,903
DATED : January 8, 1991
INVENTOR(S) : Kisun Bae; Yunghoon Joo It is certified that error appears in the above-indentified patent and that said Letters Patent is hereby corrected as shown below:

Column 3,     Line 66,     change "magnet" to --magnetic--;

Column 4,     Line 36,     capitalize "lM4" to --LM4--.

Signed and Sealed this

Twentieth Day of September, 1994

Attest:

BRUCE LEHMAN

*Attesting Officer*      *Commissioner of Patents and Trademarks*